(No Model.)

R. S. KIRKPATRICK.
WHEEL FOR CORN PLANTING MACHINES.

No. 541,095. Patented June 18, 1895.

WITNESSES:
James Thomason
Henry Willsie

INVENTOR:
R. S. Kirkpatrick
Per attorney
H. E. Willsie

UNITED STATES PATENT OFFICE.

ROBERT S. KIRKPATRICK, OF DES MOINES, IOWA.

WHEEL FOR CORN-PLANTING MACHINES.

SPECIFICATION forming part of Letters Patent No. 541,095, dated June 18, 1895.

Application filed October 11, 1894. Serial No. 525,641. (No model.)

*To all whom it may concern:*

Be it known that I, ROBERT S. KIRKPATRICK, a citizen of the United States, residing at Des Moines, in the county of Polk and State of Iowa, have invented a new and useful Improvement in Wheels for Corn-Planting Machines, of which the following is a specification.

My invention relates to that class of corn planting machines which are provided with split-wheels, as they are usually named, that is, wheels having their rims divided, circumferentially, into two parts placed a short distance from each other and secured, usually, by one set of spokes to one hub.

The object of my invention is to provide an extra, removable rim, or band, adapted to close the opening between the two parts of a split-wheel rim. I attain this object by means of the device illustrated in the accompanying drawings, in which—

Figure 1:
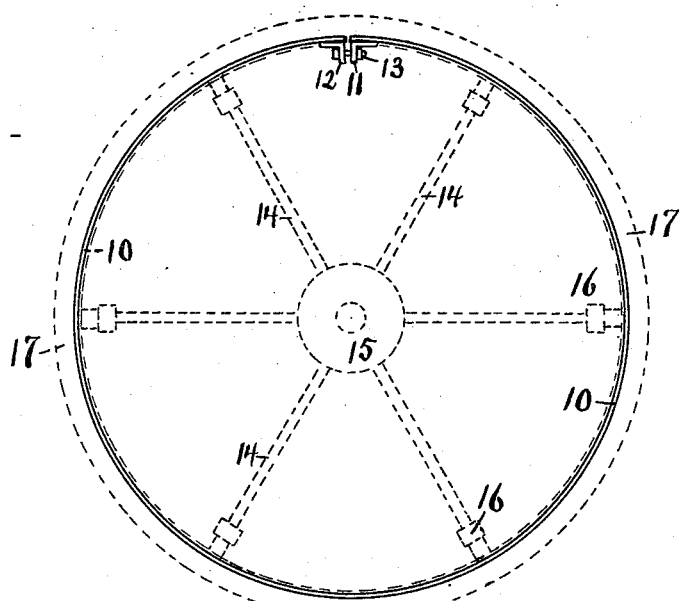
Figure 2:
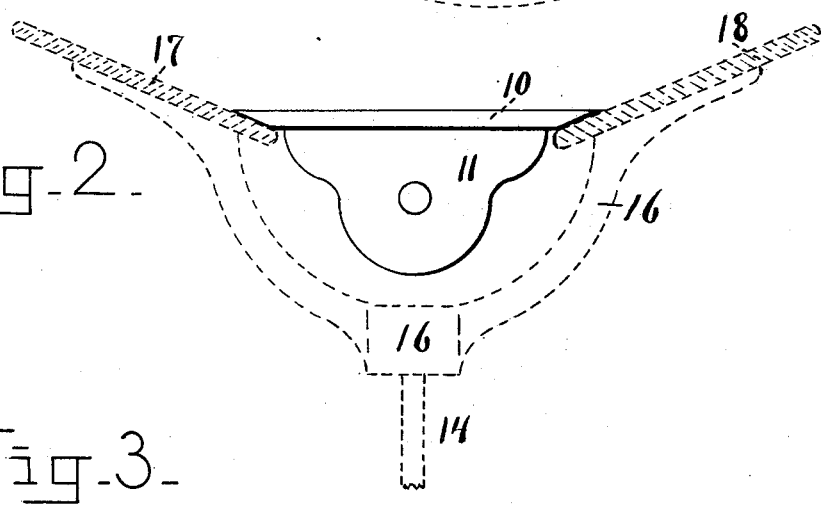
Figure 3:
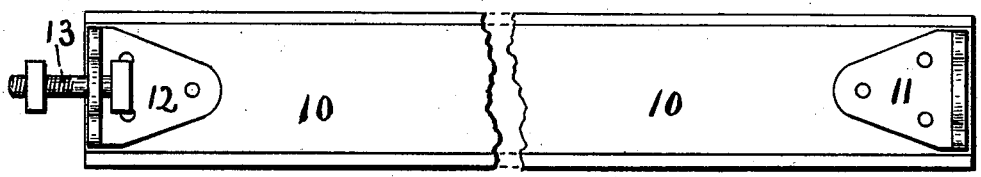

Figure 1 is a side view of my device attached to a planter-wheel. Fig. 2 is a cross-section of the rim of a split wheel and an end view of my device, and Fig. 3 is a view of my device as it appears when straightened.

Similar characters refer to similar parts throughout the several views.

Broken lines are used to illustrate the old structure of the planter wheel.

The object of split-wheels in corn planters is to prevent packing the soil down upon the seed, in order that the young plant may more easily, quickly and surely appear above the surface. It is found, however, that only when the soil is moist is it advantageous to leave the soil loose above the seed, and that when the soil is dry it is desirable to press it down upon the seed.

My improvement consists of the flexible metal strip 10, provided at the ends with the lugs 11 and 12. These lugs are firmly secured to the strip, or band, 10 by means of rivets, and each lug is provided with a bolt hole for the admission of the bolt 13.

In the form of split-wheel which I have illustrated the spokes 14 14, which are rigidly secured to the hub 15, are provided at the outer ends with castings 16, 16. To these castings are secured the two parts, 17 and 18, of the rim.

The band 10 has its edges beveled so as to fit closely, as shown in Fig. 2, between the parts, 17 and 18, of the rim.

When it is desired to use my device, the band 10 is bent into place around the wheel; the bolt 13 is inserted through the holes provided in the lugs 11 and 12; and the bolt is then tightened until the band is held firmly and securely in place. This band is made, preferably, of spring steel and in the form shown; but it may be made of other material and in other shapes and still be within the bounds of my invention. It may be wide enough to cover the entire rim of the wheel; it may have more and different lugs; or the lugs may be formed by bending over the ends of the band.

I do not claim a corn planter wheel having a circumferential opening in the tire thereof except in combination with a supplementary band adapted to close said opening, nor do I claim a supplementary tire of such construction as to be adapted to widen the rim of a wheel.

Having fully described my invention, what I claim, and desire to secure by Letters Patent, is—

1. The combination of a corn planter wheel having a circumferential opening in the rim thereof, and a removable band adapted to close said circumferential opening; the said band having a width less than the width of the rim of said wheel.

2. A removable band 10 adapted to close the opening in the rim of a split wheel; said band being provided with the lugs 11 and 12, and the bolt 13, for the purposes set forth.

3. A removable band 10 adapted to close the opening in the rim of a split-wheel; said band being provided with the described beveled edges, the lugs 11 and 12, and the bolt 13.

ROBERT S. KIRKPATRICK.

Witnesses:
E. C. PEASE,
E. J. HOLBERGER.